US009616712B2

(12) United States Patent
Nakayama et al.

(10) Patent No.: US 9,616,712 B2
(45) Date of Patent: Apr. 11, 2017

(54) PROCESS FOR PRODUCING RUBBER WET MASTER BATCH, RUBBER COMPOSITION AND TIRE

(75) Inventors: Atsushi Nakayama, Tokyo (JP); Masaaki Izuchi, Tokyo (JP); Fumiteru Nishiura, Tokyo (JP); Takeshi Kasai, Tokyo (JP); Kenji Hara, Niigata (JP); Takashi Yagi, Niigata (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1134 days.

(21) Appl. No.: 13/254,324

(22) PCT Filed: Mar. 16, 2010

(86) PCT No.: PCT/JP2010/054456
§ 371 (c)(1),
(2), (4) Date: Nov. 7, 2011

(87) PCT Pub. No.: WO2010/107032
PCT Pub. Date: Sep. 23, 2010

(65) Prior Publication Data
US 2012/0053264 A1 Mar. 1, 2012

(30) Foreign Application Priority Data

Mar. 16, 2009 (JP) ................................. 2009-062772

(51) Int. Cl.
| | |
|---|---|
| *B60C 1/00* | (2006.01) |
| *C08J 3/22* | (2006.01) |
| *C08J 99/00* | (2006.01) |
| *C08L 21/00* | (2006.01) |
| *C08K 3/04* | (2006.01) |

(52) U.S. Cl.
CPC ............... *B60C 1/00* (2013.01); *C08J 3/226* (2013.01); *C08K 3/04* (2013.01); *C08J 2321/00* (2013.01); *C08J 2407/00* (2013.01); *C08J 2409/10* (2013.01); *C08J 2421/02* (2013.01); *C08L 2310/00* (2013.01)

(58) Field of Classification Search
USPC ........................................................ 524/496
See application file for complete search history.

(56) References Cited

U.S. PATENT DOCUMENTS

| | | | |
|---|---|---|---|
| 3,004,940 A | 10/1961 | King et al. | |
| 3,294,720 A | 12/1966 | Beber et al. | |
| 3,294,733 A * | 12/1966 | Medalia et al. | 523/334 |
| 3,654,218 A * | 4/1972 | Wesseling et al. | 523/334 |
| 4,029,633 A | 6/1977 | Hagopian et al. | |
| 5,599,868 A | 2/1997 | Bohm et al. | |
| 2003/0088006 A1* | 5/2003 | Yanagisawa et al. | 524/425 |
| 2007/0173567 A1* | 7/2007 | Ishino | 523/351 |
| 2007/0203284 A1 | 8/2007 | Schuch et al. | |

FOREIGN PATENT DOCUMENTS

| | | |
|---|---|---|
| EP | 1 283 219 A2 | 2/2003 |
| EP | 1 607 408 A1 | 12/2005 |
| EP | 1 816 143 A1 | 8/2007 |
| JP | 11-049895 A | 2/1999 |
| JP | 2004-099625 A | 4/2004 |
| JP | 2005-008877 A | 1/2005 |
| JP | 2008-201958 A | 9/2008 |
| JP | 2009-40904 A | 2/2009 |

OTHER PUBLICATIONS

Communication dated Feb. 10, 2015 from the European Patent Office in counterpart application No. 10753524.7.

* cited by examiner

*Primary Examiner* — Bijan Ahvazi
*Assistant Examiner* — Thuy-Al N Nguyen
(74) *Attorney, Agent, or Firm* — Sughrue Mion, PLLC

(57) ABSTRACT

Provided are a process for efficiently producing a rubber wet master batch in which a dispersibility of carbon black in the rubber is improved, in which a reinforcing property and an abrasion resistance of the rubber can be enhanced by using carbon black having a high surface activity, in which a yield of the carbon black in the wet master batch obtained is not reduced and in which a handling property of the carbon black is good as compared with master batches prepared by using a granulated and dried substance of carbon black prepared by a conventional wet method and non-granulated carbon black, a carbon black-containing rubber wet master batch obtained by the above process and a rubber composition and a tire prepared by using the master batch.

It is a process for producing a rubber wet master batch comprising a step for mixing a slurry (A) in which a filler containing carbon black is dispersed with a rubber liquid (B) in which a rubber component is dispersed or dissolved, wherein the slurry (A) is prepared by using a filler containing a carbon black granulated substance which is granulated by a wet method and which stays in a non-drying state.

12 Claims, No Drawings

PROCESS FOR PRODUCING RUBBER WET MASTER BATCH, RUBBER COMPOSITION AND TIRE

CROSS REFERENCE TO RELATED APPLICATIONS

This application is a National Stage of International Application No. PCT/JP2010/054456 filed Mar. 16, 2010, claiming priority based on Japanese Patent Application No. 2009-062772 filed Mar. 16, 2009, the contents of all of which are incorporated herein by reference in their entirety.

BACKGROUND OF THE INVENTION

The present invention relates to a process for producing a rubber wet master batch, a carbon black-containing rubber wet master batch obtained by the above process and a rubber composition and a tire prepared by using the above master batch. More specifically, the present invention relates to a process for efficiently producing a rubber wet master batch in which use of a carbon black granulated substance granulated by a wet method and staying in a non-drying state for preparing a filler-dispersed slurry containing carbon black makes it possible to improve more a dispersibility of carbon black in the rubber, control more readily a content thereof and enhance a reinforcing property, an abrasion resistance, a low heat generating property and a cracking resistant growing property of the rubber than a case using a generally commercially available dried carbon black granulated substance and carbon black subjected to no granulation operation (so-called fluffy carbon, and hereinafter referred to as non-granulated carbon), a carbon black-containing rubber wet master batch obtained by the above process and a rubber composition and a tire prepared by using the master batch described above.

BACKGROUND ART

Carbon black has so far been widely used as a filler for reinforcing rubber. This carbon black itself is fine particles of a nanometer level and therefore deteriorated in a handling property in an original form by scattering, and accordingly, granulated and dried carbon blacks are usually used.

To classify roughly a granulation process of carbon black, it is classified into a dry method and a wet method. The wet method in which powder carbon black and an aqueous solution containing water or a granulation aid are continuously supplied to a granulation equipment at a fixed proportion to granulate the carbon black, and it is a principal industrial means of a granulation process at present.

For example, molasses, magnesium lignin sulfonate, potassium lignin sulfonate and the like are used as the granulation aid described above.

The handling property is improved by using the above granulated and dried products of carbon blacks, but the carbon blacks themselves are reduced in a surface activity, and therefore the problem that when it is used as a filler for reinforcing rubber, the rubber is inevitably reduced in a reinforcing property and an abrasion resistance.

On the other hand, a wet master batch process is generally known as a process for producing rubber which is excellent in a low heat generating property, an abrasion resistance and a cracking resistant growing property. In the above process, a slurry obtained by mixing in advance with a filler such as carbon black, silica and the like at a fixed proportion to finely disperse the filler in water by a mechanical force is mixed with a rubber latex, and then a substance coagulated by adding a coagulating agent such as acid, inorganic salt, amine and the like to the mixture is recovered and dried (refer to, for example, patent documents 1, 2 and 3).

However, carbon blacks used for producing the above wet master batch are commercially available granulated and dried products and involve the problem described above, and a reinforcing property and an abrasion resistance of the rubber can not necessarily be sufficiently satisfied.

On the other hand, a technique in which non-granulated carbon black is applied to a wet master batch is disclosed in a patent document 4. In the above technique, non-granulated carbon black is introduced from a production line of carbon black directly into a master batch production step. In this case, oxygen is not present in atmosphere around carbon black, and therefore the merit that a surface of the carbon black is not oxidized and that a surface activity thereof is maintained in a high level is involved therein. However, since carbon black is not granulated, a handling property thereof is inferior, and the problem that the carbon black yield in the master batch production step is liable to be reduced by scattering is involved therein. Further, in the production of the master batch, non-granulated carbon black is dispersed into a rubber latex merely by means of an agitator, and therefore the problem that a dispersibility of the carbon black is not necessarily satisfactory has been involved therein as well.

Patent document 1: Japanese Patent Publication No. 43851/1976
Patent document 2: Japanese Patent Publication No. 10576/1979
Patent document 3: Japanese Patent Application Laid-Open No. 99625/2004
Patent document 4: European Patent Publication No. 1362880A

DISCLOSURE OF THE INVENTION

The present invention has been made under the situations described above, and an object of the present invention is to provide a process for efficiently producing a rubber wet master batch in which a dispersibility of carbon black is improved, in which a reinforcing property and an abrasion resistance of the rubber can be enhanced by maintaining a high surface activity thereof, in which a yield of the carbon black in the wet master batch obtained is not reduced and in which a handling property of the carbon black is good as compared with master batches prepared by using a granulated and dried product of carbon black prepared by a conventional wet method and non-granulated carbon black, a carbon black-containing rubber wet master batch obtained by the above process and a rubber composition and a tire prepared by using the master batch described above.

Intensive investigations repeated by the present inventors in order to achieve the object described above have resulted in finding that the problem described above is solved by a process for producing a carbon black-containing rubber wet master batch comprising a step for mixing a slurry in which an inorganic filler containing carbon black is dispersed with a rubber liquid, wherein the slurry described above is prepared by using a filler containing a carbon black granulated substance which is granulated by a wet method and which stays in a non-drying state and that the object can be achieved.

The present invention has been completed based on the above knowledges.

The present invention provides a process for producing a carbon black-containing rubber wet master batch comprising a step for mixing a slurry (A) in which a filler containing carbon black is dispersed with a rubber liquid (B) in which a rubber component is dispersed or dissolved, wherein the slurry (A) is prepared by using a filler containing a carbon black granulated substance which is granulated by a wet method and which stays in a non-drying state, a carbon black-containing rubber wet master batch obtained by the above process, a rubber composition prepared by using the above carbon black-containing rubber wet master batch and a tire prepared by using the above rubber composition.

In the process for producing a rubber wet master batch according to the present invention, a carbon black granulated substance staying in a non-drying state which is granulated by a wet method is used as carbon black to prepare a filler slurry, and this is mixed with a rubber liquid to produce a carbon black-containing rubber wet master batch, so that effects shown below are exerted.

(1) A handling property of the carbon black is good, and scattering can be inhibited. Further, the carbon black-containing filler slurry can readily be prepared.

(2) Since the carbon black granulated substance staying in a non-drying state is not processed on such an oxidative high temperature condition that is usually used in a drying step, a surface activity thereof is high, and the rubber composition prepared by using the above master batch can enhance a reinforcing property and an abrasion resistance of the rubber.

(3) A yield of the carbon black in the master batch is not reduced more than those of master batches prepared by using a granulated and dried product of carbon black prepared by a conventional wet method and non-granulated carbon black.

(4) The carbon black-containing filler slurry is mixed with the rubber liquid to produce the master batch, and therefore a dispersibility of the carbon black in the master batch is good.

(5) A whole required energy in the production of the above master batch is small.

(6) In a case where a moisture content of the carbon black granulated substance staying in a non-drying state is about 30 to 70% by mass, a case where a diameter thereof is about 0.1 to 10 mm or a case where a hardness thereof is about 1.0 to 100 cN, the effects of (1) to (5) described above are exerted well.

(7) In a case where the filler in the filler-dispersed slurry has a specific aggregate size distribution and where a 24M4DBP oil absorption of the dried filler recovered from the slurry has a specific value, the effects of (1) to (5) described above are exerted better.

(8) A slurry in which a filler comprising a non-drying carbon black granulated substance, silica and/or other inorganic fillers is dispersed, preferably the above aqueous dispersion slurries can be used as the carbon black-containing filler slurry, and also in the above case, the effects of (1) to (5) described above can be exerted.

(9) When the rubber liquid containing the rubber component is a natural rubber latex and/or a synthetic diene base rubber latex, the effect of (2) described above is exerted better.

(10) A mixture of the filler-dispersed slurry and the rubber liquid is subjected to chemical and physical coagulation treatment, and a coagulated substance is taken out and subjected to drying treatment, whereby the targeted carbon black-containing rubber wet master batch can efficiently be produced.

(11) The carbon black-containing rubber wet master batch can be produced at a good productivity by using a specific drying equipment and a specific kneading device in drying treatment.

According to the present invention, a process for producing a rubber wet master batch which exerts the above effects can be provided. Further, capable of being provided are a carbon black-containing rubber wet master batch obtained by the above process, a rubber composition prepared by using the above master batch and a tire prepared by using the above rubber composition.

BEST MODE FOR CARRYING OUT THE INVENTION

First, the process for producing a carbon black-containing rubber wet master batch according to the present invention shall be explained.

Process for Producing a Rubber Wet Master Batch:

The process for producing a rubber wet master batch (hereinafter referred to merely as the wet master batch) according to the present invention is characterized by a process for producing a carbon black-containing rubber wet master batch comprising a step for mixing a slurry (A) in which an inorganic filler containing carbon black is dispersed with a rubber liquid (B) in which a rubber component is dispersed or dissolved, wherein the slurry (A) is prepared by using a filler containing a carbon black granulated substance staying in a non-drying state which is granulated by a wet method.

Slurry (A):

The slurry (A) is a slurry prepared by dispersing a filler containing carbon black in a dispersion medium.

<Carbon Black>

In the present invention, a carbon black granulated substance which is granulated by a wet method and which stays in a non-drying state is used as the carbon black used for preparing the slurry (A).

A method for granulating carbon black by the wet method shall not specifically be restricted, and capable of being employed are methods which have so far been publicly known, for example, a method in which granulating water corresponding to a moisture content slightly lower than a plastic limit of the carbon black is added and in which the mixture is stirred and rotated. A granulating aid, for example, molasses, magnesium lignin sulfonate, potassium lignin sulfonate and the like can be added to the granulating water described above.

The grade of the carbon black used for producing the carbon black granulated substance staying in a non-drying state includes carbon blacks used usually in the rubber industry, for example, SAF, HAF, ISAF, FEF, CPF and mixtures of the above grades.

In the present invention, the carbon black granulated substance staying in a non-drying state is preferably carbon blacks having a moisture content falling in a range of 30 to 70% by mass from the viewpoint of having a bead form and good dispersion. A moisture content of 55 to 65% by mass is more preferred.

A loss on heating of the carbon black in the above carbon black granulated substance which is determined at 150 to 900° C. by a thermogravimetric analytical (TGA) method is preferably 0.87 to 1.5% by mass. If the loss on heating is 0.87% by mass or more, a rolling resistance of the tire is further improved. On the other hand, if the loss on heating is 1.5% by mass or less, the production conditions of the carbon black are liable to be controlled.

From the above viewpoints, the loss on heating is more preferably 0.88 to 1.4% by mass, further preferably 0.89 to 1.2% by mass.

Further, a diameter of the above carbon black granulated substance is preferably about 0.1 to 10 mm, more preferably 0.5 to 5 mm from the viewpoint of a handling property and a dispersibility in the slurry.

Furthermore, a hardness of the above carbon black granulated substance is preferably 1.0 to 100 cN, more preferably 10 to 50 cN from the viewpoint of a handling property and a dispersibility in the slurry.

Also, a transmittance of toluene extract of the above carbon black granulated substance is preferably 90% or more. If the transmittance of toluene extract is 90% or more, the tar content which inhibits the reinforcing property is reduced, and therefore it is preferred.

Use of the above carbon black granulated substance staying in a non-drying state makes it possible to improve a handling property and inhibit scattering thereof and makes a dispersibility in the slurry better, and since a surface activity of the carbon black is high, a reinforcing property and an abrasion resistance of the rubber can be enhanced.

<Inorganic Filler>

In the present invention, the slurry (A) can contain a filler comprising the foregoing carbon black granulated substance staying in a non-drying state and at least one selected from silica and inorganic fillers represented by Formula (1):

$$nM.xSiO_y.zH_2O \qquad (1)$$

(wherein M is at least one selected from metal selected from aluminum, magnesium, titanium, calcium and zirconium, oxides or hydroxides of the above metals, hydrates thereof and carbonates of the metals described above; and n, x, y and z are an integer of 1 to 5, an integer of 0 to 10, an integer of 2 to 5 and an integer of 0 to 10 respectively).

The silica described above shall not specifically be restricted and is preferably wet silica, dry silica and colloidal silica. They can be used alone or in a mixture.

Capable of being used as the inorganic filler represented by Formula (1) described above are, to be specific, alumina ($Al_2O_3$) such as γ-alumina, α-alumina and the like, alumina monohydrate ($Al_2O_3.H_2O$) such as boehmite, diaspore and the like, aluminum hydroxide ($Al(OH)_3$) such as gibbsite, bayerite and the like, aluminum carbonate ($Al_2(CO_3)_2$), magnesium hydroxide ($Mg(OH)_2$), magnesium oxide (MgO), magnesium carbonate ($MgCO_3$), talc ($3MgO.4SiO_2.H_2O$), attapulgite ($5MgO.8SiO_2.9H_2O$), titan white ($TiO_2$), titan black ($TiO_{2n-1}$), calcium oxide (CaO), calcium hydroxide ($Ca(OH)_2$), magnesium aluminum oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$ and the like), magnesium silicate ($Mg_2SiO_4$, $MgSiO_3$ and the like), calcium silicate ($Ca_2.SiO_4$ and the like), aluminum calcium silicate ($Al_2O_3.CaO.2SiO_2$ and the like), calcium magnesium silicate ($CaMgSiO_4$), calcium carbonate ($CaCO_3$), zirconium oxide ($ZrO_2$), zirconium hydroxide ($Zr(OH)_2.nH_2O$), zirconium carbonate ($Zr(CO_3)_2$) and crystalline aluminosilicates containing hydrogen, alkali metal or alkaline earth metal which corrects a charge, such as various zeolites.

Further, the inorganic filler represented by Formula (1) is preferably the filler in which M is at least one selected from aluminum metal, oxide or hydroxide of aluminum, hydrates thereof and carbonate of aluminum.

<Preparation of Slurry (A)>

In the present invention, the above slurry (A) is preferably a slurry prepared by dispersing a filler comprising the carbon black granulated substance staying in a non-drying state, silica used if necessary and at least one selected from the inorganic fillers represented by Formula (1) in a dispersing medium by means of a high speed shearing mixer.

In the present invention, the high speed shearing mixer used for preparing the slurry (A) is a high speed shearing mixer comprising a rotor and a stator part, wherein the rotor which rotates at a high speed and the fixed stator are set through a narrow clearance, and a high shearing speed is generated by rotation of the rotor.

High shearing means that a shearing speed is usually 2000/s or more, preferably 4000/s or more.

The high speed shearing mixer includes, for example, commercially available mixers such as a homomixer manufactured by PRIMIX Corporation, a colloid mill manufactured by PUC AG., CAVITRON manufactured by CAVITRON AG., a high shear mixer manufactured by Shilverson Machines, Inc. and the like.

The characteristics of the slurry (A) in the present invention are that (i) an aggregate size distribution of the filler in the slurry liquid is a volume average aggregate diameter (mv) of 25 μm or less and a 90 volume % aggregate diameter (D90) of 30 μm or less and that (ii) a 24M4DBP oil absorption of the dried filler recovered from the slurry (A) is maintained preferably at 93% or more of a 24M4DBP oil absorption thereof before dispersed in the dispersing medium. In the above case, the 24M4DBP oil absorption is a value measured according to ISO 6894.

More preferably, the volume average aggregate diameter (mv) is 20 μm or less, and the 90 volume % aggregate diameter (D90) is 25 μm or less. Setting the volume average aggregate diameter (mv) to 20 μm or less and the 90 volume % aggregate diameter (D90) to 25 μm or less allows dispersion of the filler in the rubber to be improved more and a reinforcing property and an abrasion resistance of the rubber composition to be enhanced more.

On the other hand, if an excessive shearing force is applied onto the slurry in order to reduce the volume average aggregate diameter (mv) and the 90 volume % aggregate diameter (D90), a structure of the filler is broken in a certain case, and a 24M4DBP oil absorption of the dried filler recovered from the slurry (A) is reduced in a certain case. A 24M4DBP oil absorption of the dried filler recovered from the slurry (A) is preferably 93% or more of a 24M4DBP oil absorption of the filler before dispersed in the dispersing medium from the viewpoint of improving a reinforcing property of the rubber composition. More preferably, it is 96% or more.

In the slurry (A), a concentration of the filler described above is preferably 1 to 15% by mass, and it falls in a range of particularly preferably 2 to 10% by mass. If a concentration of the filler is 1% by mass or more, a volume of the slurry required can be reduced, and therefore it is preferred. On the other hand, if it is 15% by mass or less, the slurry can be reduced in a viscosity and therefore is enhanced in a workability, and it is preferred.

In the present invention, the above slurry (A) is preferably an aqueous dispersion slurry prepared by using water as a dispersing medium from the viewpoint of the mixing property particularly when a natural rubber latex and/or a synthetic diene base rubber latex are used as the rubber liquid (B) described later.

Liquid (B):

The rubber liquid (B) in the present invention is prepared by dispersing or dissolving the rubber component, and a natural rubber and/or a synthetic diene base rubber can be used as the rubber component. The above rubber liquid (B) includes a natural rubber latex and/or a synthetic diene base rubber latex and organic solvent solutions of synthetic diene base rubbers prepared by solution polymerization. Among them, the natural rubber latex and/or the synthetic diene base rubber latex are suited from the viewpoint of the performances of the wet master batch obtained and easiness of producing it.

Capable of being used as the natural rubber latex are field latices, ammonia-treated latices, centrifugally condensed latices, deproteinized latices obtained by enzymatic treatment, saponification treatment and the like, chemically modified latices and combinations of the latices described above.

Capable of being used as the synthetic diene base rubber latex are, for example, lattices of styrene-butadiene polymer rubber, nitrile rubber, polychloroprene rubber and the like.

The above lattices may be used alone or in combination of two or more kinds thereof.

The process for producing a carbon black-containing rubber wet master batch according to the present invention is preferably a process comprising a step (a) for mixing the slurry (A) with the rubber liquid (B), a step (b) for subjecting the above mixed liquid to chemical and/or physical coagulation treatment to take out a coagulated substance formed and if necessary, a step (c) for subjecting the coagulated substance taken out to drying treatment.

Step (a):

The step (a) in the present invention is a step for mixing the slurry (A) with the rubber liquid (B) each described above.

A method for mixing the carbon black-containing filler slurry (A) with the rubber liquid (B) includes, for example, a method in which the above slurry (A) is put in a homomixer and in which the rubber liquid (B) is dropwise added thereto while stirring and a method in which contrary to the above, the slurry (A) is dropwise added to the rubber liquid (B) while stirring it. Further, a method in which a slurry (A) flow and a rubber liquid (B) flow each having a constant flow amount proportion are mixed under a heavy hydraulic stirring condition can be used as well.

Thus, a mixed liquid of the carbon black-containing filler slurry (A) and the rubber liquid (B) containing the rubber component is prepared.

Step (b):

The step (b) in the present invention is a step for subjecting the mixed liquid obtained in the step (a) described above to chemical and/or physical coagulation treatment and taking out a coagulated substance formed.

The chemical coagulation treating method is carried out by a method which has so far been publicly known, for example, by adding acid such as formic acid and sulfuric acid and salts such as sodium chloride and the like.

On the other hand, the physical coagulation treating method includes a method in which coagulation is accelerated by changing temperature by steam heating or freezing and a method in which coagulation is carried out by applying a strong shearing force.

The above chemical and physical coagulation treating methods may be used alone or in combination of plural methods thereof.

The coagulated substance formed by the above coagulation treatment is taken out by using a solid-liquid separating means which has so far been publicly known, and it is preferably sufficiently washed. Usually, a method for washing with water is employed for washing.

Step (c):

The step (c) in the present invention is a step for subjecting the coagulated substance taken out in the step (b) described above and preferably washed to drying treatment preferably after dehydrated.

Centrifugal dehydration, compression dehydration and squeeze carried out by using a monoaxial or pluriaxial screw can be used as means for dehydration, and publicly known means such as a hot blast dryer, a vacuum dryer, a freeze dryer and the like can be used as means for drying.

Further, a method in which dehydration and drying treatment is carried out while applying a mechanical shearing force is a preferred method as well. In this case, a continuous kneading equipment or a continuous multiaxial kneading extruding equipment is preferably used from the industrial productivity. Further, a continuous multiaxial kneading extruding equipment having equivalent direction rotation or different direction rotation is preferably used, and a continuous biaxial kneading extruding equipment is particularly preferably used.

Thus, the rubber wet master batch of the present invention can be efficiently produced.

According to the production process of the present invention for a rubber wet master batch, the carbon black-containing filler-dispersed slurry is prepared, as described above, by using the carbon black granulated substance staying in a non-drying state which is granulated by a wet method, whereby capable of being efficiently provided is a rubber wet master batch in which a dispersibility of the carbon black in the rubber is improved, in which a reinforcing property and an abrasion resistance of the rubber can be enhanced since the carbon black having a high surface activity can be used, in which a yield of the carbon black in the wet master batch obtained is not reduced and in which a handling property of the carbon black is good as compared with master batches prepared by using a conventional carbon black granulated and dried substance and non-granulated carbon black.

Further, the present invention provides as well a carbon black-containing rubber wet master batch obtained by the process of the present invention described above.

Carbon Black-Containing Rubber Wet Master Batch:

The carbon black-containing rubber wet master batch of the present invention is a master batch obtained by the production process of the present invention described above, and it is used for preparing a rubber composition described later. In order to prevent the above wet master batch from being deteriorated during storage, the wet master batch containing various rubber additives is preferred, and particularly preferred is the wet master batch containing an additive for rubber having at least one effect of antioxidation, plasticization, peptization, processability improving, dispersion improving, coupling and cross-linking rate controlling or cross-linking density controlling.

Antioxidant:

The antioxidant used in the present invention includes amine base, quinoline base, phenol base, organic phosphite base and thioether base antioxidants, and among them, amine base and quinoline base antioxidants are preferred.

The amine base antioxidant includes, for example, N-(1, 3-dimethylbutyl)-N'-phenyl-p-phenylenediamime, N-phenyl-N'-isopropyl-p-phenylenediamine, alkylated diphenylamime, 4,4'-(α,α-dimethylbenzyl)diphenylamime, N-phenyl-N'-(3-methacryloyloxy-2-hydroxypropyl)-p-phenylenediamime, N-(1-methylheptyl)-N'-phenyl-p-phenylenediamime, phenyl-α-naphthylamine, octylated diphenylamime and derivatives thereof, N,N'-diphenyl-p-phenylenediamime, N,N'-di-β-naphthyl-p-phenylenediamime and the like. The quinoline base antioxidant includes, for example, a polymer of 2,2,4-trimethyl-1,2-dihydroquinoline, 6-ethoxy-2,2,4-trimethyl-1,2-dihydroquinoline and the like.

The above antioxidants may be used alone or in combination of two or more kinds thereof.

The above antioxidant auxiliaries may be used alone or in combination of two or more kinds thereof.

A method for adding the antioxidant or the antioxidant and the antioxidant auxiliary each described above to the carbon black-containing rubber wet master batch of the present invention may be in any of preparing the slurry (A), preparing the rubber liquid (B), preparing the wet master batch which is a mixed product of the slurry (A) and the rubber liquid (B) and dehydrating and drying which are explained in the production process of the present invention for a carbon black-containing rubber wet master batch described above, and a method in which the master batch after dried is mixed with the additives by means of a stirring device and the like is suited. Any of the methods for adding the antioxidants and/or the antioxidant auxiliaries described above is preferably used as a method for adding the additive for rubber having at least one effect of antioxidation, plasticization, peptization, processability improving, dispersion improving, coupling and cross-linking rate controlling or cross-linking density controlling each described above.

Further, various rubber chemicals can be added for the purpose of allowing the preferred performances of the vulcanized rubber to be exerted. The components thereof include various chemicals usually used in the rubber industry, such as vulcanizing agents, vulcanization accelerating agents, antioxidants, process oils, zinc oxide, scorch preventives, dispersion auxiliaries, stearic acid and the like.

Rubber Composition:

The rubber composition of the present invention is obtained by using the carbon black-containing rubber wet master batch of the present invention described above.

Other Rubber Components:

In the rubber composition of the present invention, the rubber component in the carbon black-containing rubber wet master batch is contained preferably in a proportion of 30% by mass or more based on a whole amount of the rubber component. The other rubber components used by adding to the wet master batch described above include conventional natural rubber and diene base synthetic rubbers, and the diene base synthetic rubbers include, for example, styrene-butadiene copolymers (SBR), polybutadiene (BR), polyisoprene (IR), butyl rubber (IIR), ethylene-propylene copolymers (EPDM) and mixtures thereof.

Blend Components:

Various chemicals usually used in the rubber industry, such as vulcanizing agents, vulcanization accelerating agents, antioxidants, process oils, zinc oxide, scorch preventives, dispersion auxiliaries, stearic acid and the like can be added to the rubber composition of the present invention as far as the object of the present invention is not damaged.

The vulcanizing agents described above include sulfur and the like, and a use amount thereof is preferably 0.1 to 10.0 parts by mass, more preferably 0.5 to 5.0 parts by mass in terms of a sulfur content based on 100 parts by mass of the rubber component.

The vulcanization accelerating agent which can be used in the rubber composition of the present invention shall not specifically be restricted and includes, for example, vulcanization accelerating agents of a thiazole base such as M (2-mercaptobenzothiazole), DM (dibenzothiazyl sulfide), CZ (N-cyclohexyl-2-benzothiazylsulfenamide), NS (N-t-butyl-2-benzothiazylsulfenamide) and the like and a guanidine base such as DPG (diphenylguanidine) and the like, and a use amount thereof is preferably 0.1 to 5.0 parts by mass, more preferably 0.2 to 3.0 parts by mass based on 100 parts by mass of the rubber component.

The process oil used as a softening agent which can be used in the rubber composition of the present invention includes, for example, paraffin base oils, naphthene base oils, aromatic base oils and the like. The aromatic base oils are used for applications in which the tensile strength and the abrasion resistance are regarded as important, and the naphthene base oils or paraffin base oils are used for applications in which the hysteresis loss and the low temperature characteristics are regarded as important. A use amount thereof is preferably 0 to 100 parts by mass based on 100 parts by mass of the rubber component, and if it is 100 parts by mass or less, a tensile strength and a low heat generating property (low fuel consumption) of the vulcanized rubber can be improved.

Further, the antioxidant which can be used in the rubber composition of the present invention includes, for example, 3C (N-isopropyl-N'-phenyl-p-phenylenediamine), 6C [N-(1,3-dimethylbutyl)-N'-phenyl-p-phenylenediamine], AW (6-ethoxy-2,2,4-trimethyl-1,2-dihydroxyquinoline) and high temperature condensation products of diphenylamine and acetone. A use amount thereof is preferably 0.1 to 6.0 parts by mass, more preferably 0.3 to 5.0 parts by mass based on 100 parts by mass of the rubber component.

Preparation and Applications of Rubber Composition:

The rubber composition of the present invention can be prepared by kneading the carbon black-containing rubber wet master batch described above, the other rubber components used if necessary and various blend components by means of a kneading equipment such as a Banbury mixer, a roll, an international mixer and the like.

The rubber composition of the present invention can be used as well, in addition to tire applications, for applications such as rubber cushions, belts, hoses, other industrial products and the like. It can suitably be used particularly as rubber for tires, and it can be applied to all tire members such as tread rubber, side rubber, ply coating rubber, bead filler rubber, belt coating rubber and the like.

Further, the present invention provides as well tires prepared by using the rubber composition of the present invention described above.

Tire:

The tire of the present invention is produced by a conventional method using the rubber composition of the present invention described above. That is, the rubber composition containing, if necessary, other rubber components and various chemicals as described above is processed into, for example, a tire tread together with the wet master batch in a non-vulcanized stage, and the tire tread is stuck for molding by a conventional method on a tire molding machine, whereby a crude tire is molded. The above crude tire is heated and pressurized in a vulcanizing equipment, whereby a tire is obtained.

The tire of the present invention thus obtained is excellent in a reinforcing property and an abrasion resistance.

EXAMPLES

Next, the present invention shall be explained below in further details with reference to examples, but the present invention shall by no means be restricted by the examples shown below.

Various measurements in the respective examples and comparative examples were carried out by the following methods.

<Non-Drying Carbon Black Granulated Substance>

(1) Average Moisture Content:

The weights of the sample about 1 g put in a crucible were measured before dried and after dried at 105° C. for 5 hours to calculate an average moisture thereof according to the following calculation equation. This procedure was repeated five times, and an average value thereof was set to an average moisture content.

$$\text{moisture content (\%)} = (\text{weight (g) before dried} - \text{weight (g) after dried}) / (\text{weight (g) before dried}) \times 100$$

(2) Loss on Heating:

A reduction in a mass of the carbon black for test observed when the temperature was elevated from 150° C. up to 900° C. at a heating rate of 15° C./minute under nitrogen atmosphere was measured by means of a conventional thermogravimetric measuring apparatus (TGA), and it was shown by mass %.

(3) Transmittance of Toluene Extract:

The transmittance of toluene extract (%) was measured by a method described in an eighth item B method of JIS K 6218:1997 and shown by a percentage based on purified toluene.

(4) Average Granule Diameter:

The diameters of 1000 granulated substances were measured at a magnification of 30 times by means of an optical microscope, and an average value thereof was set to an average granule diameter.

(5) Average Granule Hardness:

Measured according to JIS K 6219-3.

<Filler-Dispersed Slurry>

(4) Measurement of Aggregate Size Distribution of the Filler in the Slurry Liquid (Volume Average Aggregate Diameter (mv) and 90 Volume % Aggregate Diameter (D90)):

Measured by means of a laser diffraction type aggregate size distribution meter (model MICROTRAC FRA) using a water solvent (refractive index: 1.33). An aggregate refractive index of 1.57 was used in all measurements. In order to prevent the filler from being re-coagulated, the measurement was carried out immediately after dispersed.

(5) 24M4DBP Oil Absorption of the Filler:

Measured according to ISO 6894.

(6) Slurrying Energy Index:

An electric energy required for slurrying was measured and shown by an index, wherein it was based on an electric energy in Comparative Example 2. The smaller the numerical value is, the smaller the energy consumption is, and it is preferred.

<Compounded Rubber>

(7) Carbon Black Gel Content:

A compounded rubber having each composition shown in Table 2 was cut narrowly, and after measuring a mass thereof, it was put in a sample cage made of a metal gauze (150 mesh) having a known tare mass and immersed as it was in toluene for 24 hours. Then, the cage was taken out to sufficiently dry a toluene-insoluble matter (carbon gel), and a mass thereof was measured. A proportion (% by mass) of a mass (a mass obtained by removing the toluene-insoluble matters such as carbon black and the like from the insoluble matter) of the natural rubber contained in the insoluble matter to a mass of the natural rubber contained in the compounded rubber was determined, and it was shown by an index, wherein that of the rubber composition in Comparative Example 5 was set to 100. It is shown that the larger the value is, the more the carbon black gel content is.

(8) Carbon Black Dispersibility:

Measured according to ISO 11345:2006 C method.

(9) Carbon Black Content:

Measured according to JIS K 6227/ISO 1408:1995.

<Vulcanization Physical Properties of Rubber Composition>

(10) Rupture Strength:

A tensile strength was determined when measured at 23° C. according to JIS K 6251-1993. The larger the value is, the higher the reinforcing property is.

(11) Abrasion Resistance:

An abrasion amount was measured at a slip rate of 40% at room temperature by means of a Lambourn type abrasion test equipment, and an inverse number thereof was shown by an index, wherein that of the rubber composition in Comparative Example 5 was set to 100. The larger the value is, the less the mass is reduced, and the better the abrasion resistance is.

(12) Impact Resilience:

Measured at room temperature (25° C.) according to a JIS K 6255:1996 Tripso type impact resilience test method, and it was shown by an index, wherein a value of Comparative Example 5 was set to 100. The larger the value is, the larger the impact resilience is, and it is better.

Example 1

(1) Preparation of Carbon Black Slurry

Carbon black (N220: average granule diameter 1.7 mm, average granule hardness 21.5 cN, taken out from an outlet of a wet granulating equipment in producing carbon black) having an average moisture content of 52% by mass and staying in a non-drying state after wet granulated was put in water in an amount of 45 parts by mass in terms of a dried substance and subjected to slurrying treatment at a revolution rate of 4800 rpm for 30 minutes by means of a high shear mixer manufactured by Silverson Machines, Inc. to prepare a carbon black-containing slurry having a slurry concentration of about 5% by mass. The carbon black slurry was prepared in a scale of the slurry 20 kg. An aggregate size distribution of the carbon black in the slurry obtained above was a volume average aggregate diameter mv=4.9 μm and D90 (90 volume % aggregate diameter)=8.3 μm.

Also, a 24M4DBP oil absorption of the carbon black (CB) before dispersed was 99 mL/100 g; a 24M4DBP oil absorption of slurry-recovered and dried CB was 96 mL/100 g; and a retention ((24M4DBP oil absorption of slurry-recovered and dried CB)/(24M4DBP oil absorption of CB before dispersed)×100) of the oil absorptions was 97%.

Further, the slurrying energy index was 60.

(2) Preparation of Wet Master Batch

A whole amount of the carbon black-containing slurry obtained in (1) described above was mixed with 1000 parts by mass of a natural rubber-condensed latex containing ammonia diluted to 10% by mass while stirring, and then the mixture was coagulated by adding formic acid thereto to control it to pH 4.7. Next, the above coagulated substance was filtrated through a nonwoven cloth and dehydrated, and then it was continuously treated by means of a double shaft extruding equipment at a discharge temperature of 150° C., whereby a wet master batch was prepared.

A content (% by mass) of the carbon black in the above wet master batch was determined. The measurement result is shown in Table 1.

Example 2

(1) Preparation of Carbon Black Slurry

A carbon black-containing slurry having a slurry concentration of about 5% by mass was prepared in the same manner as in Example 1 (1), except that in Example 1 (1), the slurrying treating time was changed to 20 minutes. An aggregate size distribution of the carbon black in the slurry obtained above was a volume average aggregate diameter mv=5.1 μm and D90 (90 volume % aggregate diameter)=8.4 μm.

Also, a 24M4DBP oil absorption of the carbon black (CB) before dispersed was 99 mL/100 g; a 24M4DBP oil absorption of slurry-recovered and dried CB was 97 mL/100 g; and a retention ((24M4DBP oil absorption of slurry-recovered and dried CB)/(24M4DBP oil absorption of CB before dispersed)×100) of the oil absorptions was 98%.

Further, the slurrying energy index was 53.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

Example 3

(1) Preparation of Carbon Black Slurry

A carbon black-containing slurry having a slurry concentration of about 5% by mass was prepared in the same manner as in Example 1 (1), except that in Example 1 (1), the slurrying treating time was changed to 15 minutes. An aggregate size distribution of the carbon black in the slurry obtained above was a volume average aggregate diameter mv=5.3 μm and D90 (90 volume % aggregate diameter)=8.5 μm.

Also, a 24M4DBP oil absorption of the carbon black (CB) before dispersed was 99 mL/100 g; a 24M4DBP oil absorption of slurry-recovered and dried CB was 98 mL/100 g; and a retention ((24M4DBP oil absorption of slurry-recovered and dried CB)/(24M4DBP oil absorption of CB before dispersed)×100) of the oil absorptions was 99%.

Further, the slurrying energy index was 43.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

Example 4

A carbon black-containing slurry having a slurry concentration of about 5% by mass was prepared in the same manner as in Example 1 (1), except that in Example 1 (1), a loss on heating of the carbon black measured by thermogravimetric analysis (TGA) at 150° C. up to 900° C. in a non-drying state was changed to 1.1% by mass. An aggregate size distribution of the carbon black in the slurry obtained above was a volume average aggregate diameter mv=4.8 μm and D90 (90 volume % aggregate diameter)=8.2 μm.

Also, a 24M4DBP oil absorption of the carbon black (CB) before dispersed was 98 mL/100 g; a 24M4DBP oil absorption of slurry-recovered and dried CB was 98 mL/100 g; and a retention ((24M4DBP oil absorption of slurry-recovered and dried CB)/(24M4DBP oil absorption of CB before dispersed)×100) of the oil absorptions was 97%.

Further, the slurrying energy index was 60.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

Example 5

A carbon black-containing slurry having a slurry concentration of about 5% by mass was prepared in the same manner as in Example 1 (1), except that in Example 1 (1), a loss on heating of the carbon black measured by thermogravimetric analysis (TGA) at 150° C. up to 900° C. in a non-drying state was changed to 1.4% by mass. An aggregate size distribution of the carbon black in the slurry obtained above was a volume average aggregate diameter mv=5.0 μm and D90 (90 volume % aggregate diameter)=8.4 μm.

Also, a 24M4DBP oil absorption of the carbon black (CB) before dispersed was 99 mL/100 g; a 24M4DBP oil absorption of slurry-recovered and dried CB was 97 mL/100 g; and a retention ((24M4DBP oil absorption of slurry-recovered and dried CB)/(24M4DBP oil absorption of CB before dispersed)×100) of the oil absorptions was 98%.

Further, the slurrying energy index was 60.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

Example 6

A carbon black-containing slurry having a slurry concentration of about 5% by mass was prepared in the same manner as in Example 1 (1), except that in Example 1 (1), a loss on heating of the carbon black measured by thermogravimetric analysis (TGA) at 150° C. up to 900° C. in a non-drying state was changed to 1.3% by mass. An aggregate size distribution of the carbon black in the slurry obtained above was a volume average aggregate diameter mv=4.9 μm and D90 (90 volume % aggregate diameter)=8.4 μm.

Also, a 24M4DBP oil absorption of the carbon black (CB) before dispersed was 98 mL/100 g; a 24M4DBP oil absorption of slurry-recovered and dried CB was 96 mL/100 g; and a retention ((24M4DBP oil absorption of slurry-recovered and dried CB)/(24M4DBP oil absorption of CB before dispersed)×100) of the oil absorptions was 98%.

Further, the slurrying energy index was 60.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

Comparative Example 1

(1) Preparation of Carbon Black Slurry

A carbon black-containing slurry having a slurry concentration of about 5% by mass was prepared in the same manner as in Example 1 (1), except that in Example 1 (1), fluffy non-granulated carbon black (N220, taken out from an outlet of a crushing equipment subsequent to a bag filter in producing carbon black) was used in place of the non-drying carbon black granulated substance. An aggregate size distribution of the carbon black in the slurry obtained above was a volume average aggregate diameter mv=5.6 μm and D90 (90 volume % aggregate diameter)=8.7 μm.

Also, a 24M4DBP oil absorption of the carbon black (CB) before dispersed was 99 mL/100 g; a 24M4DBP oil absorption of slurry-recovered and dried CB was 98 mL/100 g; and a retention ((24M4DBP oil absorption of slurry-recovered and dried CB)/(24M4DBP oil absorption of CB before dispersed)×100) of the oil absorptions was 99%.

Further, the slurrying energy index was 56.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

Comparative Example 2

(1) Preparation of Carbon Black Slurry

A carbon black-containing slurry having a slurry concentration of about 5% by mass was prepared in the same manner as in Example 1 (1), except that in Example 1 (1), carbon black (N220: average granule diameter 1.0 mm, average granule hardness 7.7 cN) which was dried after wet granulated was used in place of the non-drying carbon black granulated substance. An aggregate size distribution of the carbon black in the slurry obtained above was a volume average aggregate diameter mv=5.4 μm and D90 (90 volume % aggregate diameter)=8.9 μm.

Also, a 24M4DBP oil absorption of the carbon black (CB) before dispersed was 99 mL/100 g; a 24M4DBP oil absorption of slurry-recovered and dried CB was 97 mL/100 g; and a retention ((24M4DBP oil absorption of slurry-recovered and dried CB)/(24M4DBP oil absorption of CB before dispersed)×100) of the oil absorptions was 98%.

Further, the slurrying energy index was 100.

(2) Preparation of Wet Master Batch

A whole amount of the carbon black-containing slurry obtained in (1) described above was used to produce a wet master batch in the same manner as in Example 1 (2) and evaluate it. The results thereof are shown in Table 1.

TABLE 1

| | | Example | | | | | | Comparative Example | |
|---|---|---|---|---|---|---|---|---|---|
| | | 1 | 2 | 3 | 4 | 5 | 6 | | |
| | | Kind of CB | | | | | | | |
| | Kind & state of CB | N220 Non-drying after wet granulated | N220 Non-drying after wet granulated | N220 Non-drying after wet granulated | N220 Non-drying after wet granulated | N220 Non-drying after wet granulated | N220 Non-drying after wet granulated | 1 N220 Fluffy non-granulated | 2 N220 Dried after wet granulated |
| Carbon black (CB)-containing slurry | CB addition amount (mass part) | 45 | 45 | 45 | 45 | 45 | 45 | 45 | 45 |
| | Average granule hardness of granulated substance (cN) | 21.5 | 21.5 | 21.5 | 21.0 | 22.0 | 21.5 | — | 7.7 |
| | TGA loss on heating (mass %) | 0.89 | 0.89 | 0.89 | 1.1 | 1.4 | 1.3 | 0.89 | 0.82 |
| | Transmittance of toluene extract (%) | 95 | 95 | 95 | 93 | 91 | 92 | 95 | 97 |
| | Slurry concentration (mass %) | 5 | 5 | 5 | 5 | 5 | 5 | 5 | 5 |
| | Slurrying time (min.) | 30 | 20 | 15 | 30 | 30 | 30 | 30 | 30 |
| | CB average moisture content (mass %) | 55 | 55 | 55 | 55 | 56 | 56 | 3.0 | 1.0 |
| | Slurrying energy index | 60 | 53 | 43 | 60 | 60 | 60 | 56 | 100 |
| | CB handling property | No Scattering | No Scattering | No Scattering | No Scattering | No Scattering | No Scattering | Notable Scattering | Slight Scattering |
| Rubber latex | Kind of rubber | Natural rubber | Natural rubber | Natural rubber | Natural rubber | Natural rubber | Natural rubber | Natural rubber | Natural rubber |
| | Rubber addition amount (mass part) | 100 | 100 | 100 | 100 | 100 | 100 | 100 | 100 |
| Wet master batch | CB content (mass part) | 45.2 | 44.6 | 44.5 | 44.8 | 45.0 | 44.7 | 38.2 | 44.2 |

Slurrying energy (index): index in which a slurrying energy in Comparative Example 2 was set to 100.

As can be found from the results shown in Table 1, since the carbon black does not cause scattering in preparing the slurries in the examples, the handling property is good, and a yield of the carbon black in the master batch is high. In contrast with this, the carbon black causes marked scattering in Comparative Example 1, and a yield of the carbon black in the master batch is low. Further, the carbon black was observed to cause slight scattering as well in Comparative Example 2.

Examples 7 to 12 and Comparative Examples 3 to 5

The wet master batches obtained in Examples 1 to 6 and Comparative Examples 1 and 2 were used respectively in Examples 7 to 12 and Comparative Examples 3 and 4 to prepare the respective rubber compositions having blend compositions shown in Table 2 by means of a Banbury mixer.

In Comparative Example 5, the respective components in the blend composition shown in Table 2 were kneaded by means of a Banbury mixer without using the master batch to prepare a rubber composition.

The respective rubber compositions were subjected to vulcanization treatment at 150° C. for 30 minutes to prepare samples for test and evaluate the physical properties of the vulcanized rubbers. The results thereof are shown in Table 2.

In the rubber composition prepared in Comparative Example 5, an index of a carbon black gel content was 100, and a carbon black dispersibility was 5.1.

TABLE 2

| | | Example | | | | | | Comparative Example | | |
|---|---|---|---|---|---|---|---|---|---|---|
| | | 7 | 8 | 9 | 10 | 11 | 12 | 3 | 4 | |
| Kind of wet master batch | | Example 1 | Example 2 | Example 3 | Example 4 | Example 5 | Example 6 | Comparative Example 1 | Comparative Example 2 | 5 — |
| Wet master batch composition | Natural rubber (mass part) | 100 | 100 | 100 | 100 | 100 | 100 | 100 | 100 | — |
| | Carbon black (mass part) | 45.2 | 44.6 | 44.5 | 44.8 | 45.0 | 44.7 | 38.2 | 44.2 | — |
| Blended raw materials in the composition (mass part) | Natural rubber | — | — | — | — | — | — | — | — | 100 |
| | Carbon black (N220) | — | — | — | — | — | — | — | — | 45 |
| | Stearic acid | 2 | 2 | 2 | 2 | 2 | 2 | 2 | 2 | 2 |
| | Antioxidant 6C[1)] | 1 | 1 | 1 | 1 | 1 | 1 | 1 | 1 | 1 |
| | Zinc oxide | 4 | 4 | 4 | 4 | 4 | 4 | 4 | 4 | 4 |
| | Vulcanization accelerator NS[2)] | 1.2 | 1.2 | 1.2 | 1.2 | 1.2 | 1.2 | 1.2 | 1.2 | 1.2 |
| | Sulfur | 1.5 | 1.5 | 1.5 | 1.5 | 1.5 | 1.5 | 1.5 | 1.5 | 1.5 |
| Compounded rubber characteristic | CB gel content (index) | 140 | 142 | 135 | 145 | 150 | 142 | 98 | 130 | 100 |
| | CB dispersibility | 9.8 | 9.6 | 9.5 | 9.7 | 10.0 | 9.7 | 9.7 | 9.5 | 5.1 |
| Vulcanized rubber characteristic | Fracture strength (MPa) | 33.2 | 32.9 | 32.7 | 33.1 | 33.9 | 32.1 | 29.2 | 32.8 | 28.6 |
| | Impact resilience (index) | 123 | 121 | 120 | 124 | 126 | 122 | 125 | 118 | 100 |
| | Abrasion resistance (index) | 125 | 123 | 122 | 129 | 135 | 124 | 92 | 110 | 100 |

Remarks:
1) Antioxidant 6C: N-(1,3-dimethylbutyl)-N'-phenyl-p-phenylenediamine
2) Vulcanization accelerator NS: N-t-butyl-2-benzothiazyl-sulfeneamide As can be found from the results shown in Table 2, the rubber compositions prepared in the examples are excellent in a fracture strength, an impact resilience and an abrasion resistance and have a large carbon black gel content as compared with the rubber compositions prepared in the comparative examples. This is because of the results that the carbon black is increased in a dispersibility due to the wet master batch and that in addition thereto, an excellent reinforcing effect is brought about by using carbon black having a high surface activity. On the other hand, in Comparative Example 3, the same effects are expected to the rubber physical properties, but it is difficult to control an amount of the carbon black in the rubber, and therefore it is difficult to obtain the stable performances. Further, Comparative Example 4 is limited to having received a merit exerted by the effects of the wet master batch, and the rubber performances thereof are not comparable to those of the examples.

INDUSTRIAL APPLICABILITY

According to the production process of the present invention for a rubber wet master batch, using a carbon black granulated substance which is granulated by a wet method and which stays in a non-drying state to prepare a carbon black-containing filler-dispersed slurry makes it possible to efficiently provide a rubber wet master batch in which a dispersibility of the carbon black in the rubber is improved, in which a reinforcing property and an abrasion resistance of the rubber can be enhanced since carbon black having a high surface activity can be used, in which a yield of the carbon black in the wet master batch obtained is not reduced and in which a handling property of the carbon black is good as compared with master batches prepared by using a conventional carbon black granulated and dried substance and non-granulated carbon black.

What is claimed is:

1. A process for producing a rubber wet master batch comprising:
   a step for taking out a non-drying carbon black granulated substance from an outlet of a wet granulating equipment for producing carbon black;
   a step for preparing a slurry (A) by using a filler containing the non-drying carbon black granulated substance; and
   a step for mixing the slurry (A), in which the filler containing the non-drying carbon black granulated substance is dispersed, with a rubber liquid (B),
   wherein a moisture content of the non-drying carbon black granulated substance is 30 to 65% by mass, and
   wherein a loss on heating of the non-drying carbon black granulated substance which is determined at 150 to 900° C. by thermogravimetric analysis (TGA) is 0.87 to 1.5% by mass, and a transmittance of toluene extract thereof is 90% or more.

2. The process for producing a rubber wet master batch according to claim 1, wherein a diameter of the non-drying carbon black granulated substance is 0.1 to 10 mm.

3. The process for producing a rubber wet master batch according to claim 1, wherein a hardness of the non-drying carbon black granulated substance is 1.0 to 100 cN.

4. The process for producing a rubber wet master batch according to claim 1, wherein an aggregate size distribution of the filler in the slurry (A) is a volume average aggregate diameter (my) of 25 µm or less and a 90 volume % aggregate diameter (D90) of 30 µm or less, and a 24M4DBP oil absorption of the dried filler recovered from the slurry (A) is maintained at 93% or more of a 24M4DBP oil absorption of the filler staying in a dried state before dispersed in a dispersing medium.

5. The process for producing a rubber wet master batch according to claim 1, wherein the dispersing medium for the slurry (A) is water.

6. The process for producing a rubber wet master batch according to claim 1, wherein the slurry (A) contains a filler comprising the non-drying carbon black granulated substance and at least one selected from silica and inorganic fillers represented by Formula (1):

$$nM \cdot xSiO_y \cdot zH_2O \qquad (1)$$

wherein M is at least one selected from metal selected from aluminum, magnesium, titanium, calcium and zirconium, oxides or hydroxides of the above metals, hydrates thereof and carbonates of the metals; and n, x, y and z are an integer of 1 to 5, an integer of 0 to 10, an integer of 2 to 5 and an integer of 0 to 10, respectively.

7. The process for producing a rubber wet master batch according to claim 1, wherein the rubber component in the rubber liquid (B) is a natural rubber and/or a synthetic diene base rubber.

8. The process for producing a rubber wet master batch according to claim 7, wherein the rubber liquid (B) is a natural rubber latex and/or a synthetic diene base rubber latex.

9. The process for producing a rubber wet master batch according to claim 1, wherein (a) the slurry (A) is mixed with the rubber liquid (B); and (b) the above mixed liquid is subjected to chemical and/or physical coagulation treatment to take out a coagulated substance formed.

10. The process for producing a rubber wet master batch according to claim 9, wherein (c) the coagulated substance taken out is subjected to drying treatment.

11. The process for producing a rubber wet master batch according to claim 10, wherein the drying treatment is carried out by means of a hot blast dryer, a vacuum dryer or a freeze dryer.

12. The process for producing a rubber wet master batch according to claim 10, wherein the drying treatment is carried out by means of a continuous kneading equipment or a continuous multiaxial kneading extruding equipment.

* * * * *